US009659177B1

(12) United States Patent
Juels et al.

(10) Patent No.: US 9,659,177 B1
(45) Date of Patent: May 23, 2017

(54) AUTHENTICATION TOKEN WITH CONTROLLED RELEASE OF AUTHENTICATION INFORMATION BASED ON CLIENT ATTESTATION

(71) Applicants: Ari Juels, Brookline, MA (US); Kevin D. Bowers, Melrose, MA (US)

(72) Inventors: Ari Juels, Brookline, MA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 667 days.

(21) Appl. No.: 13/625,465

(22) Filed: Sep. 24, 2012

(51) Int. Cl.
*G06F 3/00* (2006.01)
*G06F 21/57* (2013.01)

(52) U.S. Cl.
CPC ............ *G06F 21/57* (2013.01); *G06F 21/575* (2013.01)

(58) Field of Classification Search
CPC .......... G06F 21/57; G06F 12/14; G06F 15/16; H04L 2209/127; H04L 9/3271
USPC ............................................... 726/9, 5, 6, 10
See application file for complete search history.

(56) References Cited

U.S. PATENT DOCUMENTS

| 2004/0267944 A1* | 12/2004 | Britt, Jr. ............... | H04L 29/06 709/229 |
| 2005/0131752 A1* | 6/2005 | Gracie ............... | G06Q 10/0635 705/7.28 |
| 2007/0057763 A1* | 3/2007 | Blattner ............... | G06F 3/03543 340/5.52 |
| 2007/0143831 A1* | 6/2007 | Pearson ................. | H04L 63/08 726/5 |
| 2009/0273451 A1* | 11/2009 | Soppera ............. | G06K 19/0723 340/10.4 |
| 2011/0067095 A1* | 3/2011 | Leicher ................... | H04L 63/06 726/10 |
| 2012/0072975 A1* | 3/2012 | Labrador ................ | G06F 21/31 726/6 |
| 2012/0151209 A1* | 6/2012 | Visnyak ............... | H04L 9/3234 713/166 |
| 2012/0167188 A1* | 6/2012 | Poornachandran . | H04L 63/0853 726/7 |

* cited by examiner

*Primary Examiner* — Joseph P Hirl
*Assistant Examiner* — Sayed Beheshti Shirazi
(74) *Attorney, Agent, or Firm* — Ryan, Mason & Lewis, LLP (57) ABSTRACT

An authentication token configured to generate authentication information comprises an attestation module. The attestation module of the authentication token is configured to receive an attestation generated by an attestation module of a client, to perform a check on the received attestation, and to release the authentication information to a designated entity if the check indicates that the attestation is valid. The designated entity may comprise the client itself or another entity that participates in an authentication process involving at least one of the authentication token and the client. The authentication token in performing the check on the attestation received from the client may determine if the received attestation conforms to a predetermined policy. The attestation may comprise a platform attestation generated by the client for a given instantiated software stack of the client.

20 Claims, 3 Drawing Sheets

AUTHENTICATION TOKEN WITH CONTROLLED RELEASE OF AUTHENTICATION INFORMATION BASED ON CLIENT ATTESTATION

FIELD

The field relates generally to information security, and more particularly to techniques for providing secure access to protected resources.

BACKGROUND

Numerous techniques are known for providing secure access to protected resources. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Although two-factor authentication based on token passcodes can provide adequate security in many applications, a need remains for further improvements. For example, even in strongly-defended systems, security breaches are becoming more common due to the increasing sophistication of advanced persistent threats (APTs). APTs are usually mounted by well-funded attackers with very specific targets.

SUMMARY

Illustrative embodiments of the present invention provide authentication tokens that are configured for controlled release of authentication information based on client attestations. For example, an authentication token may be instrumented to consume an attestation received from a client and to release authentication information only if the client attestation is valid. A given such arrangement may be referred to herein as involving authentication-based consumption of platform attestations, and can better protect sensitive resources than conventional authentication approaches, particularly in the presence of APTs.

In one embodiment, an authentication token configured to generate authentication information comprises an attestation module. The attestation module of the authentication token is configured to receive an attestation generated by an attestation module of a client, to perform a check on the received attestation, and to release the authentication information to a designated entity if the check indicates that the attestation is valid. The designated entity may comprise the client itself or another entity that participates in an authentication process involving at least one of the authentication token and the client. The authentication token in performing the check on the attestation received from the client may determine if the received attestation conforms to a predetermined policy.

The authentication information released to the client or other designated entity if the attestation is valid may comprise a current passcode or another type of authentication information utilized in an authentication process involving at least one of the authentication token and the client. For example, the authentication information may comprise information that is associated with a challenge-response protocol carried out between the authentication token and the client or another designated entity.

The attestation may comprise a platform attestation generated by the client for a given instantiated software stack of the client. For example, the attestation may be generated at least in part by a trusted platform module of the client based on one or more measurements made on the instantiated software stack of the client. In other embodiments, the attestation may be generated at least in part utilizing a designated root of trust component implemented within the client, other than a trusted platform module of the client.

The illustrative embodiments can be configured to overcome the drawbacks of conventional techniques by providing enhanced protection for sensitive resources in a wide variety of different applications, thereby serving as an effective deterrent to APTs and other security threats. Moreover, such embodiments can be implemented in a legacy-compatible manner that allows consumption of attestations without the need for any changes to server-side infrastructure.

DETAILED DESCRIPTION

Illustrative embodiments of the present invention will be described herein with reference to exemplary communication systems and associated servers, clients, tokens and other processing devices. It is to be appreciated, however, that the invention is not restricted to use with the particular illustrative system and device configurations shown.

Accordingly, the term "communication system" as used herein is intended to be broadly construed, so as to encompass, for example, systems in which multiple processing devices communicate with one another but not necessarily in a manner characterized by a client-server model.

The term "client" is similarly intended to be broadly construed herein, and may encompass, for example, a computer, mobile telephone or other processing device. Such a device may incorporate or be otherwise associated with an authentication token of a corresponding user.

The term "server" as used herein is also intended to be construed broadly, so as to encompass not only network-based servers but also numerous other types of devices that can be arranged with one or more other devices to perform authentication operations in the manner disclosed herein. A given such server therefore need not be a network-based server, and may be implemented as a portion of a device that performs other functions, as a combination of a plurality of devices, or in other forms.

As will be described, illustrative embodiments of the present invention provide functionality for authentication-based consumption of platform attestations in communication system elements such as clients and authentication tokens.

Figure 1:
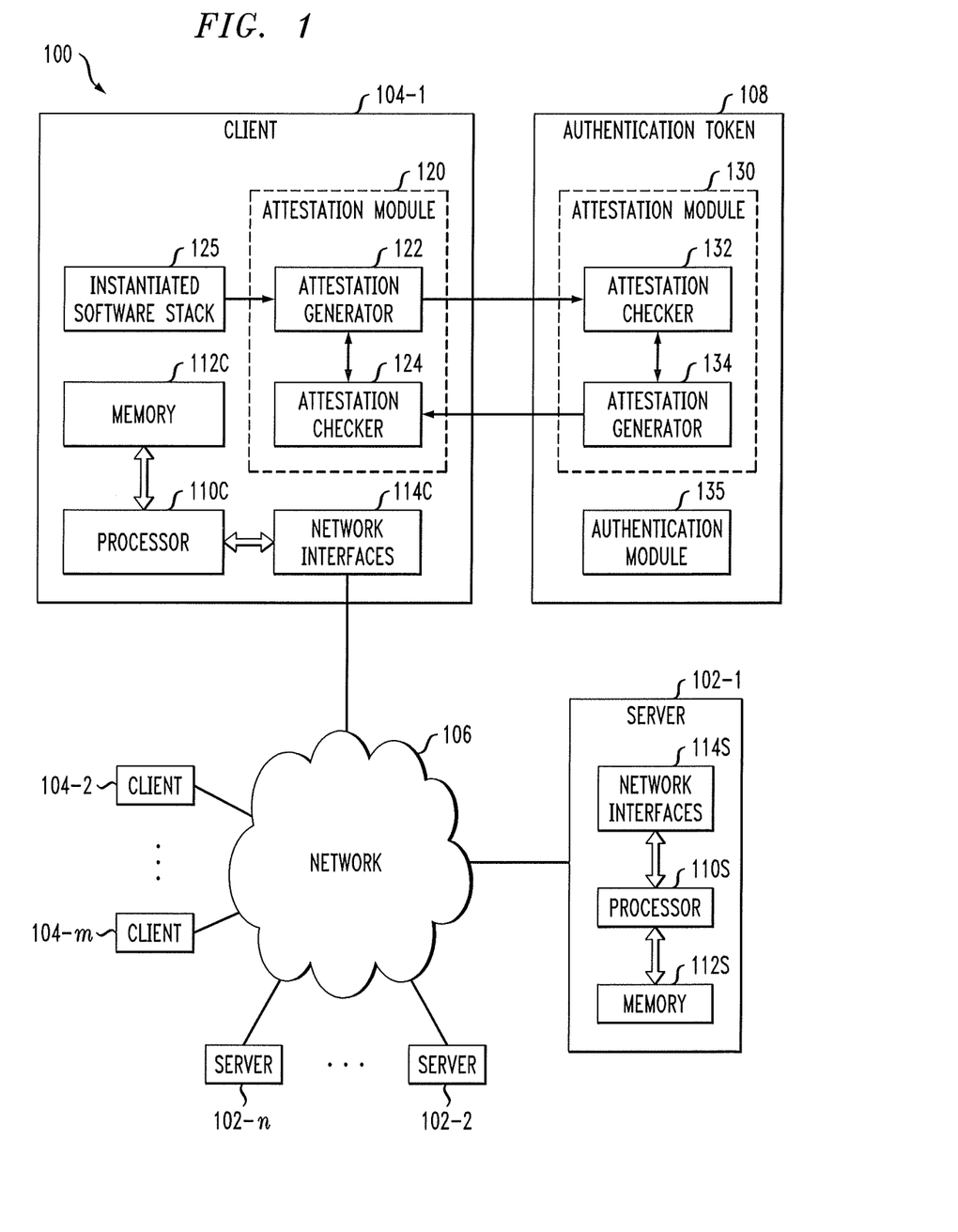
FIG. 1 is a block diagram of a communication system with authentication-based consumption of platform attestations in an illustrative embodiment of the invention.

FIG. 1 shows a communication system 100 that incorporates such functionality in an illustrative embodiment. The system 100 comprises a plurality of servers 102-1, 102-2, . . . 102-n that are configured to communicate with a plurality of clients 104-1, 104-2, . . . 104-m, over a network 106. A given client 104-1 has an authentication token 108 associated therewith. Although shown as being separate from one another in this embodiment, the client 104-1 and the authentication token 108 in other embodiments may be implemented on a common processing device, such as a computer or a mobile telephone. The authentication token 108 is generally associated with a particular system user.

The association between the client 104-1 and the authentication token 108 therefore may be only a temporary association in some embodiments. For example, the client 104-1 and the authentication token 108 may pair with one another temporarily in conjunction with performance of an authentication process that may also involve one or more additional devices, such as one or more of the servers 102.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100. It is also possible that multiple servers 102 can be implemented on a single processing device, that multiple clients 104 may be implemented on a single processing device, or that at least one server and at least one client can be implemented on the same processing device.

Moreover, as indicated above, the authentication token 108 may be implemented on the same processing device as a given client 104-1, or may be implemented on a separate processing device. The given client 104-1 and authentication token 108 may therefore both be associated with the same system user. It is possible that multiple clients 104 may be associated with the same user. Additionally or alternatively, the given client 104-1 may be a public computer utilized by multiple system users, each of whom may be equipped with his or her own authentication token.

The system 100 in the present embodiment implements one or more authentication processes in order to control user access to protected resources. An example of such a process performed using a particular arrangement of server, client and token devices will be described in conjunction with FIG. 2, but it is to be appreciated that numerous other types of authentication processes may be used in other embodiments.

A given one of the servers 102-1 in the present embodiment comprises a processor 110S coupled to a memory 112S. The processor 110S may comprise a microprocessor, a microcontroller, an application-specific integrated circuit (ASIC), a field-programmable gate array (FPGA) or other type of processing circuitry, as well as portions or combinations of such circuitry elements. The memory 112S may comprise random access memory (RAM), read-only memory (ROM) or other types of memory, in any combination.

The memory 112S and other memories disclosed herein may be viewed as examples of what are more generally referred to as "computer program products" storing executable computer program code.

Also included in the server 102-1 is network interface circuitry 114S. The network interface circuitry 114S allows the server 102-1 to communicate over the network 106 with the other servers 102 and with the clients 104, and may comprise one or more conventional transceivers.

The other servers 102 of the system 100 are assumed to be configured in a manner similar to that shown for server 102-1 in the figure.

A given one of the clients 104-1 in the present embodiment comprises a processor 110C coupled to a memory 112C. The processor 110C, like processor 110S in server 102-1, may comprise a microprocessor, a microcontroller, an ASIC, an FPGA or other type of processing circuitry, as well as portions or combinations of such circuitry elements, and the memory 112C may comprise RAM, ROM or other types of memory, in any combination.

Also included in the client 104-1 is network interface circuitry 114C. The network interface circuitry 114C allows the client 104-1 to communicate over the network 106 with the servers 102 and with the other clients 104, and may comprise one or more conventional transceivers.

The client 104-1 further includes an attestation module 120 that includes an attestation generator 122 coupled to an attestation checker 124. The attestation generator 122 is configured to generate one or more platform attestations for a given instantiated software stack 125 of the client 104-1. For example, the attestation generator 122 may comprise a trusted platform module (TPM) that is configured to generate attestations based on one or more measurements made on the instantiated software stack 125. In other embodiments, the attestation may be generated at least in part utilizing another designated root of trust component implemented within the attestation generator 122 of client 104-1.

The above-noted TPM of attestation generator 122 may be implemented as a hardware-supported mechanism for measuring some aspect of the instantiated software stack 125. Such a mechanism may be configured, for example, to perform boot-time measurements only, so as to implement what is more particularly referred to herein as a static root of trust. However, in other embodiments, the TPM may perform measurements on software executed after boot time, implementing what is referred to herein as a dynamic root of trust. Accordingly, the attestations generated by attestation generator 122 may include a variety of different measurements performed on the instantiated software stack 125, at or after boot time. A given attestation may comprise, for example, a digitally signed representation of the measurement for consumption by a remote entity.

Although use of hardware root of trust components to generate attestations may be preferred in some embodiments, any other type of trusted computing base may be used. These may include, for example, a virtualized TPM, a high-assurance hypervisor, or a trustworthy firmware module.

The attestation checker 124 is configured to consume one or more platform attestations generated by the authentication token 108, in order to support mutual attestation checking by the authentication token 108 and the client 104-1. Thus, in addition to the token checking an attestation from the client, the client may also check an attestation from the token. Such an arrangement can be beneficial in embodiments in which the token comprises a software application running on a multi-purpose device such as a computer or a mobile telephone. For example, mutual attestation checking in this context can provide assurances to the client that the operating system of the multi-purpose device is uncompromised, or that the token application itself has not been modified. Alternative embodiments of the invention need not support mutual attestation checking.

The attestation module 120 may be implemented at least in part in the form of software that is stored in memory 122 and executed by processor 120.

The other clients 104 of the system 100 are assumed to be configured in a manner similar to that shown for client 104-1 in the figure.

The authentication token 108 comprises an attestation module 130 that includes an attestation checker 132 coupled to an attestation generator 134. The attestation checker 132 of the authentication token 108 is configured to check attestations generated by the attestation generator 122 of the client 104-1. Similarly, the attestation checker 124 of the client 104-1 is configured to check attestations generated by the attestation generator 134 of the authentication token 108. Again, mutual attestation checking and the associated modules 124 and 134 may be eliminated in other embodiments, such that only token-based checking of client-generated attestations is supported.

Like the attestation module 120, the attestation module 130 may be implemented at least in part in the form of software that is stored in a memory of authentication token 108 and executed by a processor of that token.

The authentication token 108 may communicate directly with the client 104-1 via a wired or wireless connection. Although not specifically illustrated as such in FIG. 1, one or more of the connections over which the authentication token communicates with client 104-1 may pass through the network 106. Accordingly, authentication token 108, like the servers 102 and clients 104, may include one or more transceivers or other types of network interfaces for use in communicating with client 104-1 or other devices over the network 106. Attestations and other information can therefore be communicated between the client 104-1 and the authentication token 108 using a wide variety of different types of wired or wireless communication protocols, including, for example, near field communication (NFC) protocols such as Bluetooth, and wireless networking protocols such as WiFi and WiMAX. At least a portion of these communications may occur over network 106.

As indicated previously, each of the clients 104 may be associated with a different user, multiple clients may be associated with a single user, or multiple users may be associated with a single client. Also, each such user may be associated with a different authentication token. The term "user" as utilized herein is intended to be broadly construed so as to encompass, for example, a human user associated with a given client or set of clients, an automated user such as an application or other hardware or software component associated with a given client, or any other entity that may trigger generation of a request for a protected resource in system 100 through one of the clients 104.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured such that the authentication token 108 generates authentication information, but does not release the authentication information unless an attestation from the client 104-1 is checked and confirmed as valid. Thus, in the present embodiment, the attestation generator 122 in the attestation module 120 of the client 104-1 generates an attestation that is supplied to the attestation checker 132 in the attestation module 130 of the authentication token. The attestation checker 132 performs a check on the attestation received from the client, and releases the authentication information to a designated entity if the check indicates that the attestation is valid. The designated entity may comprise the client 104-1 itself or another entity that participates in an authentication process involving at least one of the authentication token 108 and the client 104-1.

The authentication token 108 in performing the check on the attestation received from the client may determine if the received attestation conforms to a predetermined policy. For example, the authentication token 108 may communicate with a remote authentication service to retrieve a particular policy or to check an attestation against such a policy. Such communications may be via the client 104-1 or directly with one or more of the servers 102 that provide the authentication service over network 106. Other aspects of an authentication process may be performed using similar communications. For example, the authentication token may communicate with the authentication service to identify revoked users. The particular communication channels to be used for at least a portion of the authentication process may be specified as part of the policy. As one illustration, depending on its policy and environment, a token may communicate with a given server by way of the client or may do so via some other communication channel.

The attestations in certain embodiments herein are also referred to as platform attestations as such attestations may be generated by a TPM or other similar component of a client or authentication token that relates to a trusted portion of a processing platform implemented by one or more processing devices. It should be understood, however, that a wide variety of other types of attestations may be used in implementing embodiments of the invention.

The authentication information released to the client or other designated entity if the attestation is valid may comprise a current passcode or another type of authentication information utilized in an authentication process involving at least one of the authentication token and the client. For example, the authentication information may comprise information that is associated with a challenge-response protocol carried out between the authentication token and the client or another designated entity. These and other types of authentication information are generated by an authentication module 135 of the authentication token 108. The authentication module 135 may comprise, for example, a passcode generator, a challenge-response module, or any other type of module utilized to generate token information in conjunction with an authentication process.

The authentication process may be used to control user access to protected resources, such as files or other data stored on one or more of the servers 102 or associated processing devices. Embodiments of the present invention are not limited in terms of the type of protected resources for which security is provided using the authentication processes. Other examples of protected resources may include key shares, or physical devices and applications, in addition to or in place of the above-noted files or other data. A protected resource may additionally or alternatively comprise a permission to modify a particular setting in a physical control system or other type of system.

Examples of conventional authentication processes that may be adapted for use in embodiments of the present invention are disclosed in A. J. Menezes et al., Handbook of Applied Cryptography, CRC Press, 1997, which is incorporated by reference herein. These and other conventional processes, being well known to those skilled in the art, will not be described in further detail herein, although embodiments of the present invention may incorporate aspects of such processes.

It is to be appreciated that the particular set of elements shown in FIG. 1 for providing authentication-based consumption of platform attestations is presented by way of example, and in other embodiments additional or alternative elements may be used. Thus, another embodiment may include additional networks and additional sets of servers, clients or authentication tokens, or other types and arrangements of processing devices.

As mentioned previously, various elements of system 100 such as servers, clients, authentication tokens or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms will be described below in conjunction with FIGS. 3 and 4.

Figure 2:
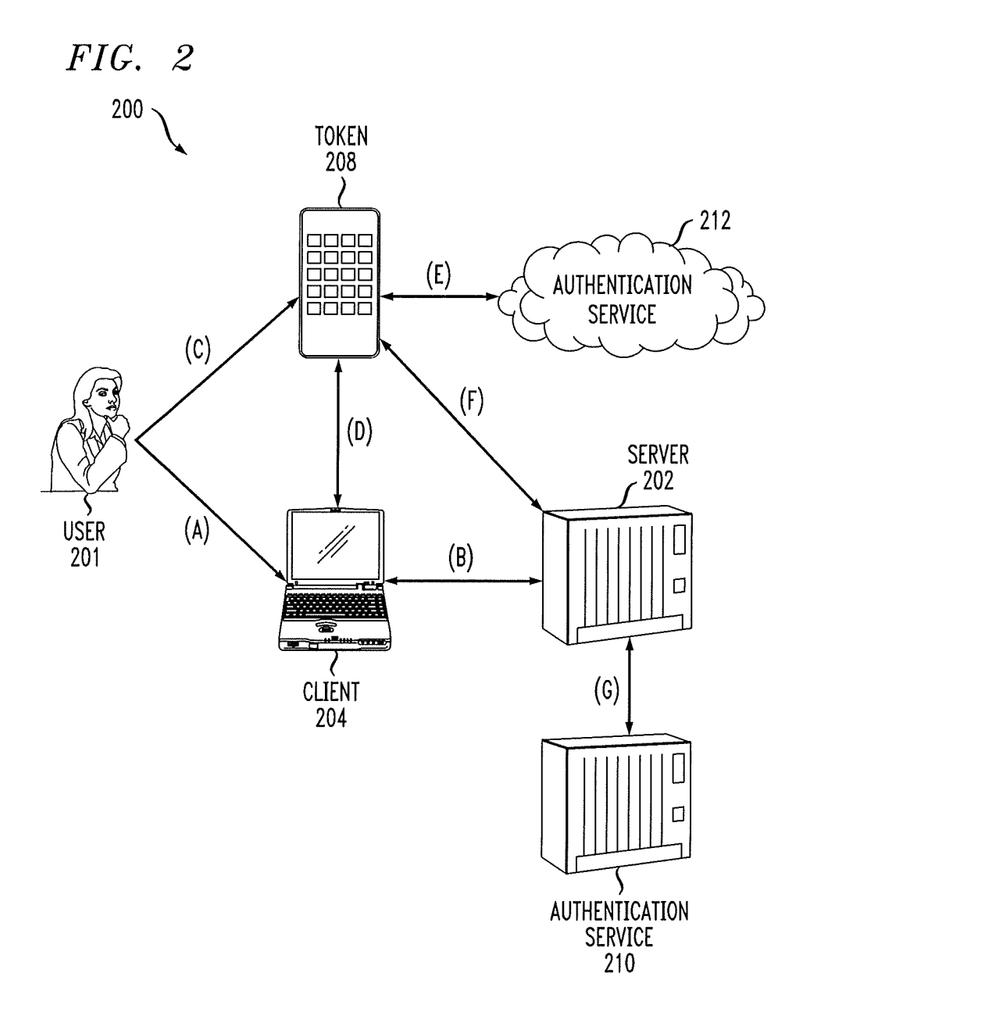
FIG. 2 is a functional diagram showing interaction between communication system elements carried out in conjunction with authentication-based consumption of platform attestations in another illustrative embodiment.

FIG. 2 shows an example of a communication system 200 corresponding generally to an implementation of communication system 100 that is utilized to authenticate a user 201. The system 200 comprises a server 202, a client 204 and an authentication token 208. These elements 202, 204 and 208 may be viewed as corresponding generally to respective server, client and token elements of the FIG. 1 system, but are more specifically shown in this embodiment as comprising a server, laptop computer and mobile telephone, respectively. The system 200 also comprises authentication service elements 210 and 212 each of which may be implemented using one or more servers such as servers 102 of the FIG. 1 system. The authentication service element 212 is more particularly illustrated as a cloud-based authentication service in the present embodiment, although other types of authentication service elements may be used in other embodiments.

Elements 202, 210 and 212 of the communication system 200 collaborate with one another in performing an authentication process responsive to a given request from user 201 for access to a protected resource. The user 201 is assumed to be human user associated with corresponding client 204 that communicates with server 202 over one or more networks, but as indicated previously the user in other embodiments may comprise an automated hardware or software component or other system entity.

The embodiments of FIGS. 1 and 2 can be configured in a legacy-compatible manner that allows consumption of platform attestations without the need for any changes to server-side infrastructure of the corresponding systems.

The client 204 in the present embodiment is more particularly assumed to comprise a laptop computer through which the user 201 accesses one or more remote services that are subject to access control protections requiring user authentication, and the authentication token 208 is more particularly assumed to comprise a mobile telephone that runs an authentication application.

The interactions among the various entities 201, 202, 204, 208, 210 and 212 in performing an exemplary authentication process in the communication system 200 are labeled in the figure as steps (A) through (G). The protected resource in this example is a bank account for which the user 201 would like to conduct a transaction using an online banking application running on the client 204.

In step (A), the user 201 interacts with the client 204 to open the online banking application.

In step (B), the client 204 initiates a remote resource request via client communication with server 202. The server 202 in this example is assumed to be associated with the bank that maintains the bank account for the user. The server 202 responsive to the remote resource request triggers an authentication session requesting that the user 201 authenticate using the token 208.

In step (C), the user 201 launches the authentication application of the token 208 and provides requested inputs such as a PIN or a biometric.

In step (D), the token 208 communicates with the client 204 to obtain an attestation from the client, which as indicated previously may comprise one or more measurements performed by an attestation generator on an instantiated software stack.

In step (E), the token 208 communicates with the cloud-based authentication service 212 to identify a policy to be applied in conjunction with processing of the attestation received from the client 204. The policy may specify valid attestations as well as appropriate corresponding token authentication factors such as GPS coordinates and time of day. The token utilizes the identified policy to verify that the attestation is compliant with the policy and therefore valid. This is one example of a technique of checking an attestation received from a client, but numerous other techniques may be used. If the token determines that the attestation is not valid, the authentication process may be terminated, with notice of such termination provided by the token to the client 204.

In step (F), assuming that the attestation was determined to be valid in the previous step, the token 208 communicates with the server 202 in support of the authentication session. For example, the token 208 may transmit an authentication passcode from a passcode generator in its authentication module 135 to the server 202 by way of the client 204. Alternatively, such a passcode or other authentication information may be released directly to the server 202 or another designated entity without going through the client.

In step (G), the server 202 contacts the authentication service 210 to determine if the presented passcode is authentic and if the user 201 should be permitted to access the bank account to perform one or more bank transactions. The authentication service 210 may be implemented as part of a more general authentication service that also includes the cloud-based service 212. Alternatively, the functions of authentication services 210 and 212 may be combined into a single server or set of servers within system 200.

As mentioned previously, some embodiments of the invention may utilize mutual attestation checking between client 204 and token 208. For example, the client 204 can check an attestation received from the token 208 during either step (D) or step (F) of the authentication process described above.

If the token 208 communicates with server 202 through the client 204, the client can check the attestation from the token during step (F), and only allow communication to the server if the token attestation is valid. This type of communication-blocking enforcement implemented by the client is applicable if the token does not have any other channel of communication with the server.

However, if the token 208 is able to communicate directly with the server 202, the client 204 may perform its check during step (D). One way to do this would be to have the client consume the attestation from the token before providing its own attestation back to the client. If the attestation received from the token is valid, the client could provide the token with additional information that is utilized in the attestation checking operation performed by the token. This may include, for example, details of one or more proposed authentication actions. The token could then check the attestation received from the client, and if the attestation is valid, perform the specified authentication actions.

The particular processing operations and other system functionality described in conjunction with the diagram of FIG. 2 are presented by way of illustrative example only, and should not be construed as limiting the scope of the invention in any way. Accordingly, certain processing operations indicated as being performed serially can instead be performed at least in part in parallel with one another. Also, alternative embodiments can use other types of processing operations for authentication-based consumption of platform attestations. For example, the particular manner in which the attestations are generated and checked, as well as the associated authentication processes, may be varied in other embodiments.

More particularly, in one alternative embodiment of the communication system 200, the token 208 may receive an authentication initiation request from the client 204 responsive to the user 201 attempting to login to the online banking service. The token then requests and verifies an attestation from the client, and if verification of the attestation is successful, performs a challenge-response protocol with the server 202 over a direct communication channel with that server. This is an example of an arrangement in which the communications between the token and the server are not channeled through the client. Authentication information generated by the token as part of the challenge-response protocol is released by the token to the server only upon validation of the attestation received from the client.

It is to be appreciated that functionality for authentication-based consumption of platform attestations such as that described in conjunction with the diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments provide improved security for authentication processes by preventing release of authentication information from an authentication token without confirmation of a valid attestation from an associated client. Such arrangements can better protect sensitive resources and also serve as highly effective deterrents to APTs and other security attacks. Moreover, embodiments of the invention can be implemented in a legacy-compatible manner that does not require any modification of existing server-side infrastructure.

Figure 3:
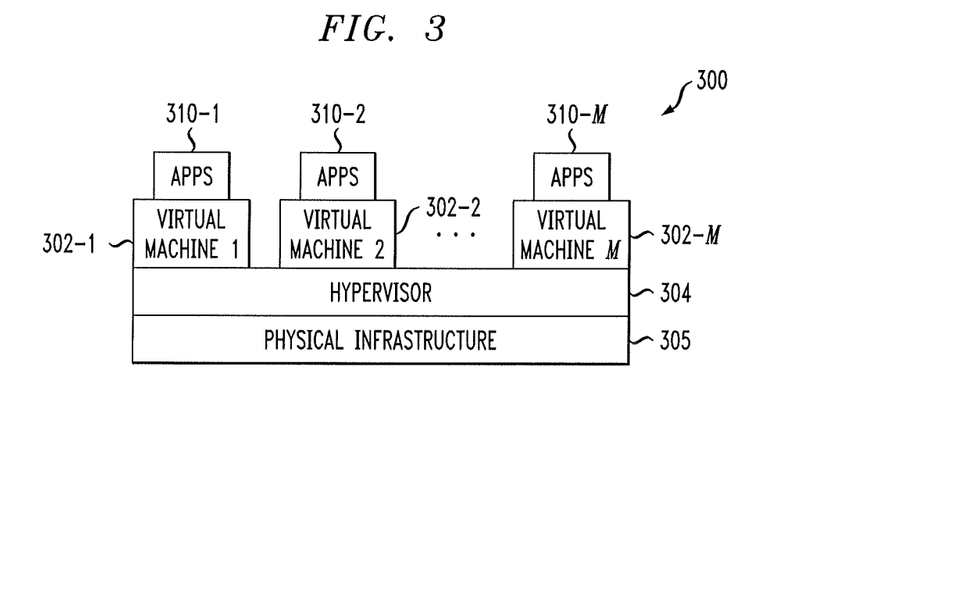
FIGS. 3 and 4 show examples of processing platforms that may be utilized to implement at least a portion of the communication systems of FIGS. 1 and 2.

Referring now to FIG. 3, portions of the communication systems 100 or 200 may comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or 200 or only portions of that system. Thus, for example, the servers 102, clients 104 and token 108 of the communication system 100 may each be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of communication system 100 or 200 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100 or 200.

In some embodiments, the client and token may reside on the same processing device, in which case the token may comprise a local attestation-consuming service. More particularly, the client and the token may be implemented on respective virtual machines controlled by a common hypervisor. Arrangements of this type as well as other virtual infrastructure embodiments may be configured to utilize the hypervisor as a root of trust component. Thus, the attestation provided by the client to the token may be generated at least in part by a hypervisor, where the hypervisor controls a virtual machine that implements the client and possibly also controls a separate virtual machine that implements the token.

As indicated previously, the system 100 or 200 may be implemented using one or more processing platforms. One or more of the processing modules or other components of system 100 or 200 may therefore each run on a computer, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
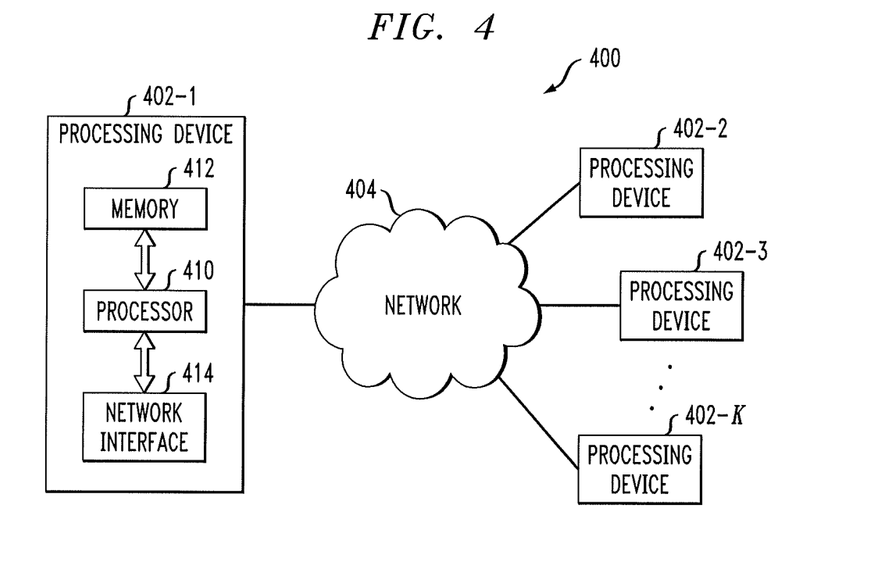

The processing platform 400 in this embodiment comprises a portion of the system 100 or 200 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 or 200 may include additional or alternative processing platforms, as well as numerous distinct processing platforms in any combination, with each such platform comprising one or more computers, storage devices or other processing devices.

Multiple elements of communication system 100 or 200 may be collectively implemented on a common processing platform of the type shown in FIG. 3 or 4, or each such element may be implemented on a separate processing platform.

Also, as mentioned previously, the servers 102, clients 104 and authentication token 108 of system 100 may be mapped to processing devices such as processing devices 402 in a variety of different manners. For example, multiple ones of the servers 102, clients 104 or token 108 may be implemented on a single processing device, or each of the servers 102, clients 104 or token 108 may be implemented on a separate processing device. Similar mappings apply with respect to the elements of system 200.

It should again be emphasized that the above-described embodiments of the invention are presented for purposes of illustration only. Many variations and other alternative embodiments may be used. For example, the techniques are applicable to a wide variety of other types of systems and processing devices that can benefit from the enhanced resource protections provided by authentication-based consumption of platform attestations of the type disclosed herein. Also, the particular configurations of elements shown in FIGS. 1, 3 and 4, and the authentication process shown in FIG. 2, can be varied in other embodiments. For example, parameters such as the number of type of attestations used and the particular system entities involved in a given authentication process can be varied in other embodiments. These and numerous other alternative embodiments within the scope of the appended claims will be readily apparent to those skilled in the art.

What is claimed is:

1. An apparatus comprising:
an authentication token configured to generate authentication information, the authentication token being implemented using one or more hardware processors;
the authentication token comprising a first attestation module configured to generate a first attestation, the first attestation module being configured:
to receive a second attestation generated by a second attestation module of a client, the second attestation module comprising a trusted platform module configured to generate the second attestation based on one or more measurements performed on an instantiated software stack at least one of: at boot time implementing a static root of trust and after boot time implementing a dynamic root of trust;
to perform a check on the second attestation; and
to release the authentication information to a designated entity if the check indicates that the second attestation is valid, wherein validation of the second attestation comprises determining if the second attestation conforms to a predetermined policy;
wherein the authentication information released to the designated entity if the second attestation is valid comprises at least one of:
a current passcode; and
information associated with a challenge-response protocol carried out between the authentication token and the designated entity; and
wherein the authentication token is further configured to provide the first attestation to the client to permit mutual attestation checking by the authentication token and the client.

2. The apparatus of claim 1 wherein the designated entity comprises the client.

3. The apparatus of claim 1 wherein the authentication token and the client are implemented on a single processing device.

4. The apparatus of claim 1 wherein the authentication token and the client are each implemented on a separate processing device.

5. The apparatus of claim 1 wherein the authentication information released to the designated entity if the second attestation is valid comprises the current passcode.

6. An apparatus comprising:
an authentication token configured to generate authentication information;
the authentication token comprising a first attestation module, the first attestation module being configured:
to receive an attestation generated by a second attestation module of a client;
to perform a check on the received attestation; and
to release the authentication information to a designated entity if the check indicates that the received attestation is valid;
wherein the authentication information released to the designated entity if the attestation is valid comprises at least one of:
a current passcode; and
information associated with a challenge-response protocol carried out between the authentication token and the designated entity; and
wherein the attestation is generated at least in part by a hypervisor that controls a virtual machine that implements the client.

7. The apparatus of claim 1 wherein the authentication token and the client are implemented on respective virtual machines controlled by a common hypervisor.

8. The apparatus of claim 1 wherein the authentication token is configured to communicate with at least one server associated with an authentication service in order to obtain information utilized to perform the check on the second attestation.

9. A processing device comprising the apparatus of claim 1.

10. A communication system comprising the processing device of claim 9.

11. A method comprising the steps of:
generating a first attestation using a first attestation module of an authentication token;
receiving in the first attestation module of the authentication token a second attestation from a second attestation module of a client, the second attestation module comprising a trusted platform module configured to generate the second attestation based on one or more measurements performed on an instantiated software stack at least one of: at boot time implementing a static root of trust; and after boot time implementing a dynamic root of trust;
performing a check on the received second attestation; and
releasing to a designated entity authentication information generated by the authentication token if the check indicates that the second attestation is valid, wherein validation of the second attestation comprises determining if the second attestation conforms to a predetermined policy; and
providing the first attestation to the client to permit mutual attestation checking by the authentication token and the client;
wherein the authentication information released to the designated entity if the second attestation is valid comprises at least one of:
a current passcode; and
information associated with a challenge-response protocol carried out between the authentication token and the designated entity.

12. The method of claim 11 wherein releasing the authentication information if the second attestation is valid comprises releasing the current passcode.

13. The method of claim 11 wherein the designated entity comprises the client.

14. The method of claim 11 wherein the authentication token and the client are implemented on respective virtual machines controlled by a common hypervisor.

15. The method of claim 11 wherein the authentication token is configured to communicate with at least one server associated with an authentication service in order to obtain information utilized to perform the check on the second attestation.

16. A computer program product comprising a non-transitory processor-readable storage medium having embodied therein one or more software programs, wherein the one or more software programs when executed by an authentication token cause the authentication token to perform the steps of:
generating a first attestation using a first attestation module of the authentication token;
receiving in the first attestation module of the authentication token a second attestation from a second attestation module of a client, the second attestation module comprising a trusted platform module configured to generate the second attestation based on one or more measurements performed on an instantiated software stack at least one of: at boot time implementing a static root of trust; and after boot time implementing a dynamic root of trust;
performing a check on the second attestation; and
releasing to a designated entity authentication information generated by the authentication token if the check indicates that the second attestation is valid, wherein validation of the second attestation comprises determining if the second attestation conforms to a predetermined policy; and
providing the first attestation to the client to permit mutual attestation checking by the authentication token and the client;
wherein the authentication information released to the designated entity if the second attestation is valid comprises at least one of:
a current passcode; and
information associated with a challenge-response protocol carried out between the authentication token and the designated entity.

17. The computer program product of claim 16 wherein releasing the authentication information if the second attestation is valid comprises releasing the current passcode.

18. The computer program product of claim 16 wherein the designated entity comprises the client.

19. The computer program product of claim 16 wherein the authentication token and the client are implemented on respective virtual machines controlled by a common hypervisor.

20. The computer program product of claim 16 wherein the authentication token is configured to communicate with at least one server associated with an authentication service in order to obtain information utilized to perform the check on the second attestation.

* * * * *

UNITED STATES PATENT AND TRADEMARK OFFICE
CERTIFICATE OF CORRECTION

PATENT NO.         : 9,659,177 B1
APPLICATION NO.    : 13/625465
DATED              : May 23, 2017
INVENTOR(S)        : Ari Juels et al.

Page 1 of 1

It is certified that error appears in the above-identified patent and that said Letters Patent is hereby corrected as shown below:

In the Claims

Claim 1, Column 12, Line 15 insert --;-- after "trust" but before "and"

Claim 11, Column 13, Line 15 delete "received"

Claim 11, Column 13, Line 26 delete "and"

Claim 16, Column 14, Line 21 delete "and"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*